(12) United States Patent
Blange

(10) Patent No.: US 7,448,151 B2
(45) Date of Patent: *Nov. 11, 2008

(54) TOOL FOR EXCAVATING AN OBJECT

(75) Inventor: Jan-Jette Blange, Rijswijk (NL)

(73) Assignee: Shell Oil Company, Houston, TX (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/563,898

(22) PCT Filed: Jul. 8, 2004

(86) PCT No.: PCT/EP2004/051404

§ 371 (c)(1),
(2), (4) Date: Jan. 9, 2006

(87) PCT Pub. No.: WO2005/005765

PCT Pub. Date: Jan. 20, 2005

(65) Prior Publication Data

US 2006/0162964 A1    Jul. 27, 2006

(30) Foreign Application Priority Data

Jul. 9, 2003   (EP) .................................. 03077159
Apr. 14, 2004  (EP) .................................. 04101505

(51) Int. Cl.
    *E02F 3/94*      (2006.01)
(52) U.S. Cl. ........................... 37/318; 175/424; 299/17; 37/323
(58) Field of Classification Search ............... 37/318, 37/319, 322, 323; 175/67, 312, 339, 340, 175/393, 424; 166/66.5; 299/17
See application file for complete search history.

(56) References Cited

U.S. PATENT DOCUMENTS 2,779,571 A     1/1957   Ortloff ........................ 255/61

(Continued)

FOREIGN PATENT DOCUMENTS

CN          1367294           9/2002

(Continued)

OTHER PUBLICATIONS

International Search Report dated Sep. 13, 2004 (PCT/EP2004/051407).

(Continued)

*Primary Examiner*—Thomas B Will
*Assistant Examiner*—Mai T Nguyen

(57) ABSTRACT

A tool for excavating an object comprises a jetting system having a nozzle arranged to receive a fluid and abrasive particles via an abrasive particle inlet, and arranged to impinge the object to be excavated with a jetted stream of the fluid mixed with the abrasive particles, the tool further having a recirculation system arranged to recirculate at least some of the abrasive particles from a return stream, downstream of the impingement of the jetted stream with the object to be excavated, back to the jetting system via the abrasive particle inlet, the abrasive particle inlet having an entrance window in which a device in a path fluidly connecting the return stream with the entrance window keeps the abrasive particle inlet free from objects of the same size or larger than the size of the window while allowing passage of the abrasive particles.

16 Claims, 5 Drawing Sheets

U.S. PATENT DOCUMENTS

| | | | |
|---|---|---|---|
| 2,913,113 A | 11/1959 | Gillette | 209/223 |
| 3,375,886 A | 4/1968 | Goodwin et al. | 175/66 |
| 3,416,614 A | 12/1968 | Goodwin et al. | 175/67 |
| 3,489,280 A | 1/1970 | Israelson et al. | 209/223 |
| 3,508,621 A | 4/1970 | Gaylord et al. | 175/67 |
| 3,759,367 A | 9/1973 | Elliott | 198/41 |
| 3,831,753 A | 8/1974 | Gaylord et al. | 209/399 |
| 3,938,600 A | 2/1976 | Essmeier | 175/422 |
| 3,949,354 A | 4/1976 | Claycomb | 340/18 |
| 3,952,857 A | 4/1976 | Nazuka | 198/41 |
| 4,055,489 A | 10/1977 | Soley | 209/223 |
| 4,119,160 A | 10/1978 | Summers et al. | 175/67 |
| 4,396,071 A | 8/1983 | Stephens | 175/50 |
| 4,534,427 A | 8/1985 | Wang et al. | 175/67 |
| 4,550,068 A | 10/1985 | Brooks et al. | 430/122 |
| 4,555,872 A | 12/1985 | Yie | 51/439 |
| 4,637,479 A | 1/1987 | Leising | 175/26 |
| 4,787,465 A | 11/1988 | Dickinson, III et al. | 175/67 |
| 4,993,503 A | 2/1991 | Fischer et al. | 175/62 |
| 5,170,891 A | 12/1992 | Barrett | 209/223.2 |
| 5,291,956 A | 3/1994 | Mueller et al. | 175/67 |
| 5,314,030 A | 5/1994 | Peterson et al. | 175/26 |
| 5,586,848 A | 12/1996 | Suwijn | 409/137 |
| 5,887,667 A | 3/1999 | Van Zante et al. | 175/67 |
| 5,944,123 A | 8/1999 | Johnson | 175/73 |
| 6,062,311 A | 5/2000 | Johnson et al. | 166/312 |
| 6,109,370 A | 8/2000 | Gray | 175/61 |
| 6,283,833 B1 | 9/2001 | Pao et al. | 451/40 |
| 6,412,643 B1 | 7/2002 | Wysolmierski | 209/213 |
| 6,510,907 B1 | 1/2003 | Blange | 175/67 |
| 6,702,940 B2 | 3/2004 | Blange | 210/222 |
| 7,017,684 B2 | 3/2006 | Blange | 175/424 |
| 2002/0079998 A1* | 6/2002 | Blange | 335/302 |
| 2006/0185907 A1 | 8/2006 | Blange | 175/424 |

FOREIGN PATENT DOCUMENTS

| | | |
|---|---|---|
| DE | 2052516 | 4/1972 |
| DE | 2832037 | 1/1980 |
| DE | 29803676 | 4/1980 |
| EP | 0069530 | 1/1983 |
| EP | 0119338 | 9/1984 |
| EP | 526087 A1 | 2/1993 |
| EP | 0763489 A1 | 3/1997 |
| EP | 1000663 | 5/2000 |
| GB | 892905 | 4/1962 |
| GB | 2284837 | 6/1995 |
| JP | 08168935 | 7/1996 |
| RU | 2114274 | 6/1998 |
| SU | 924334 | 4/1982 |
| WO | WO9112930 | 9/1991 |
| WO | WO9922112 | 5/1999 |
| WO | WO0066872 | 11/2000 |
| WO | 02/34653 | 5/2002 |
| WO | 02/092956 | 11/2002 |
| WO | WO2005005765 A1 | 1/2005 |
| WO | WO2005005766 | 1/2005 |
| WO | WO2005005767 | 1/2005 |
| WO | WO2005005768 | 1/2005 |
| WO | WO2005038189 | 4/2005 |
| WO | WO2005040546 | 5/2005 |

OTHER PUBLICATIONS

Robert D. Blevins, "Applied Fluid Dynamics Handbook", Krieger Publishing Company, p. 260.

* cited by examiner

TOOL FOR EXCAVATING AN OBJECT

The present application claims priority of European Patent Application No. 03077159.6 filed 09 Jul. 2003 and European Patent Application No. 04101505.8 filed 14 Apr. 2004.

FIELD OF THE INVENTION

The present invention relates to a tool for excavating an object, comprising a jetting system having nozzle means arranged to receive a fluid and abrasive particles via an abrasive particle inlet, and to impinge the object to be excavated with a jetted stream of fluid mixed with the abrasive particles.

BACKGROUND OF THE INVENTION

Such a tool can typically be provided on a lower end of a drill string that is deployed in a subterranean bore hole, whereby during operation the fluid is pumped in the form of a drilling fluid from surface through a longitudinal channel in the drill string to the tool and essentially back to surface in a return stream through an annular space between the drill string and the bore hole wall. In order to avoid continuous circulation of the abrasive particles through the drill string and the annular space, U.S. Pat. No. 6,510,907 proposes to provide the tool with a recirculation system for separating the abrasive particles from the return stream and re-inserting these particles into the jetting system.

Another such tool is described in International publication WO 02/34653. The recirculation system is based on a helical separator magnet that is concentrically arranged within a support member. The support member is formed by a cylindrical sleeve, of which sleeve the outer surface forms a support surface on which magnetic particles are retained by the magnetic field generated by the helical separator magnet. The separator magnet has a central longitudinal axis about which the separator magnet is rotatable relative to the sleeve.

When the separator magnet is driven into axial rotation, the magnetic particles experience a moving gradient of magnetic field strength perpendicular to the helical groove, which the particles will follow. In this way the particles are transported over the support surface back to the jetting system for re-insertion.

Both prior art tools rely on an efficient transfer of the abrasive particles from the separator magnet into the jetting system. This is of particular importance when a large number of abrasive particles must be recirculated per time unit, because in that case clusters of abrasive particles can cause an obstruction at the abrasive particle inlet of the jetting system. Clustering of the abrasive particles is enhanced by their magnetic interactions.

Moreover the return stream from which the abrasive particles are to be separated normally also contains excavation debris that may include rock grains bigger than an access window of the abrasive particle inlet into the jetting system. Such grains can block the abrasive particle inlet of the jetting system, and thereby hamper the recirculation process of abrasive particles.

SUMMARY OF THE INVENTION

In accordance with the present invention there is provided a tool for excavating an object, the tool comprising a jetting system having nozzle means arranged to receive a fluid and abrasive particles via an abrasive particle inlet, and arranged to impinge the object to be excavated with a jetted stream of the fluid mixed with the abrasive particles, the tool further comprising a recirculation system arranged to recirculate at least some of the abrasive particles from a return stream downstream impingement of the jetted stream with the object to be excavated back to the jetting system via the abrasive particle inlet, the abrasive particle inlet having an entrance window whereby filtering means are provided in a path fluidly connecting said return stream with the entrance window, which filtering means is passable for the abrasive particles.

Herewith the abrasive particle inlet is kept free from objects of the same size or larger than the size of the entrance window while the abrasive particles can reach the abrasive particle inlet.

The filtering means may be provided with one or more filter openings shaped or arranged such that the filtering means is impassable for a particle having the same projected size and shape as the entrance window of the abrasive particle inlet and at the same time such that the one or more filter openings cannot be fully blocked by one such a particle. In this way, even when one such a particle becomes stuck in one or more filter openings, there is still transport possible through another opening or through a part of the opening that is not blocked.

This can be achieved with a filter opening having a relatively large aspect ratio such that the filter opening is in one direction sized smaller than the entrance window of the abrasive particle inlet and in another direction larger.

The total passable area of the filter opening can advantageously be larger than that of the entrance window of the abrasive particle inlet so as to minimise any adverse effect that the filtering means may have on the recirculation of the abrasive particles.

In an advantageous embodiment, wherein the recirculation system comprises a support surface to guide the abrasive particles towards the abrasive particle inlet, the filtering means are provided in the form of a skirt creating a filter opening in the form of a slit between the skirt and support surface.

Such a skirt around the support surface guides the flow of drilling fluid from the bore hole annulus to the abrasive particle inlet along the support surface, thereby further supporting the transport of the abrasive particles on the support surface towards the abrasive particle inlet and into the jetting system.

BRIEF DESCRIPTION OF THE DRAWINGS

The invention will now be illustrated by way of example, with reference to the accompanying drawing wherein is schematically shown in FIG. 1 is a schematic longitudinal cross section of a tool for excavating an object constructed in accordance with an embodiment of the present invention, shown in a borehole.

DETAILED DESCRIPTION OF THE INVENTION

Figure 1:
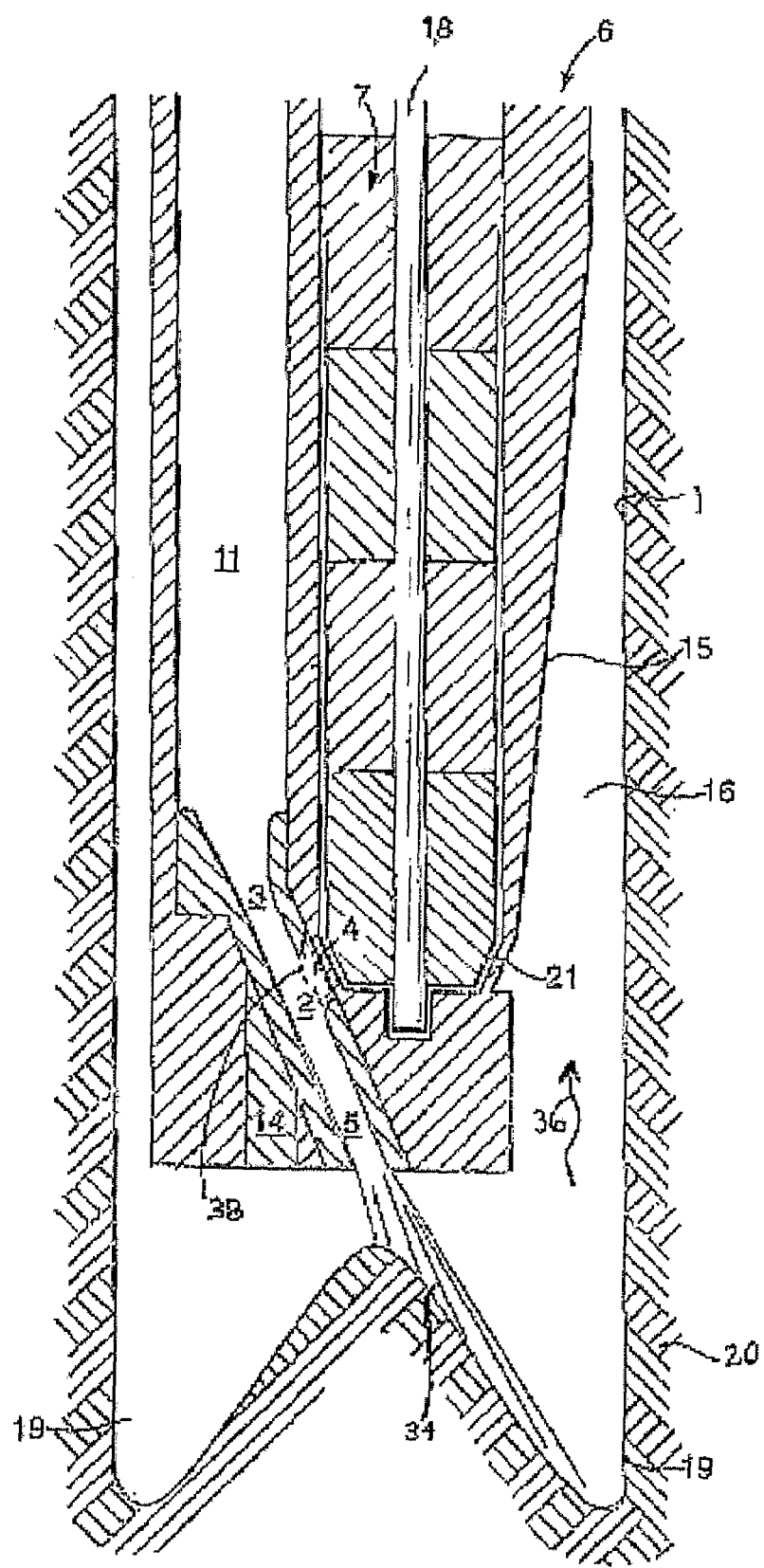

In the figures, like parts carry identical reference numerals. Where, in the following description, a direction of rotation is specified, the direction of transport is each time the viewing direction in relation to which the rotary direction is defined.

Part of a tool for excavating an object is schematically shown in longitudinal section in FIG. 1. The tool can be connected to the lower end of a drill string (not shown) extending into a borehole formed in an object such as an earth formation 20. The tool is arranged to jet a stream 34 of drilling fluid mixed with abrasive particles against the object to be excavated and to recirculate at least part of the abrasive particles.

The tool is provided with a longitudinal drilling fluid passage 1, which is at one end thereof in fluid communication with a drilling fluid channel provided in the drill string and at the other end thereof in fluid communication with a jetting system having nozzle means 3,2,5. The nozzle means 3,2,5 comprises a mixing chamber 2 that is connected to the drilling fluid passage 1 via a drilling fluid inlet 3.

The mixing chamber 2 is also in fluid communication with an abrasive particle inlet 4 for access of abrasive particles, and with a mixing nozzle 5 having an outlet (not shown) arranged to jet a stream of drilling fluid and abrasive particles against the earth formation during drilling with the drilling tool in the borehole.

The mixing chamber 2 is provided with a piece of magnetic material 14 on the side opposite from the abrasive particle inlet 4, but this is optional.

The mixing nozzle 5 is arranged inclined relative to the longitudinal direction of the drilling tool at an inclination angle of 15-30° relative to vertical, but other angles can be used. Preferably the inclination angle is about 21°, which is optimal for abrasively eroding the bottom of the bore hole by axially rotating the complete tool inside the bore hole. The mixing chamber 2 and mixing nozzle 5 are aligned with the outlet nozzle under the same angle, in order to achieve optimal acceleration of the abrasive particles.

The drilling fluid passage 1 is arranged to bypass a transport device 6 for transporting magnetic particles that is included in the tool as part of a recirculation system for the magnetic abrasive particles, which can be used if the abrasive particles contain a magnetic material. The device 6 includes a support member in the form of a slightly tapered sleeve 15 for providing a support surface extending around an essentially cylindrically shaped elongate separator magnet 7. The separator magnet 7 generates a magnetic field for retaining the magnetic particles on the support surface 15.

The drilling fluid passage 1 is fixedly arranged relative to the support surface 15 and the mixing chamber 2. The drilling fluid passage 1 has a lower end arranged near the abrasive particle inlet 4. In the present embodiment the drilling fluid passage 1 is formed inside a ridge in the axial direction which ridge is in protruding contact with the support surface 15. The drilling fluid passage 1 may alternatively be arranged free-standing from the support surface in a manner similar to that shown and described in International Publication WO 02/34653 with reference to FIG. 4 therein, or in an off-axial direction. The abrasive particle inlet 4 is located at the lower end of the ridge.

The support surface 15 has a conical shape. Alternatively, the support surface may be cylindrical.

The cylindrical separator magnet 7 is formed of four smaller magnets 7a, 7b, 7c, and 7d stacked together. A different number of the smaller magnets can also be used. Each magnet 7a, 7b, 7c, and 7d has diametrically opposed N and S poles, and the magnets are stacked in a manner that adjacent magnets have N-S directions azimuthally rotated with respect to each other about the central longitudinal axis 8 over an angle φ ( such that two essentially helical diametrically opposing bands are each formed by alternating N and S poles.

For the purpose of this specification, a magnetic pole is an area on the magnet surface or on the support surface where magnetic field lines cross the magnet surface or the support surface thereby appearing as an area of source or sink for magnetic field lines.

Due to the nature of a bipolar magnet, the magnetic field strength in the regions between the N and S poles in each of the smaller magnets 7a, 7b, 7c, and 7d is lower than in the essentially helically aligned regions around the N and S poles. In this way, the helical bands of alternating N and S poles form a high-field band of increased magnetic field strength relative to regions forming low-field band displaced by about 90° in azimuth with respect to that high-field band. In between the high- and low-field bands, there is a gradient zone where the magnetic field strength decreases from the increased value in the high-field band to the value in the low-field band.

The separator magnet 7 has a central longitudinal axis 8 and is rotatable relative to the sleeve 15 and about the central longitudinal axis 8. Drive means are provided (not shown) to drive axis 8 and thereby rotate the separator magnet 7 into either clockwise or counter clockwise rotation as dictated by the sense of the helical band. The drive means may advantageously be provided in the form of an electric motor, which motor may be controlled by a control system (not shown).

A short tapered section 11 is provided at the lower end of magnet 7d. The sleeve 15 is provided with a corresponding conical taper in a manner that the abrasive particle inlet 4 provides fluid communication between the support surface 15 surrounding the tapered section 11 and the mixing chamber 2. The conical taper is best based on the same angle as the above-discussed angle of the mixing chamber 2 and mixing nozzle 5.

Figure 2:
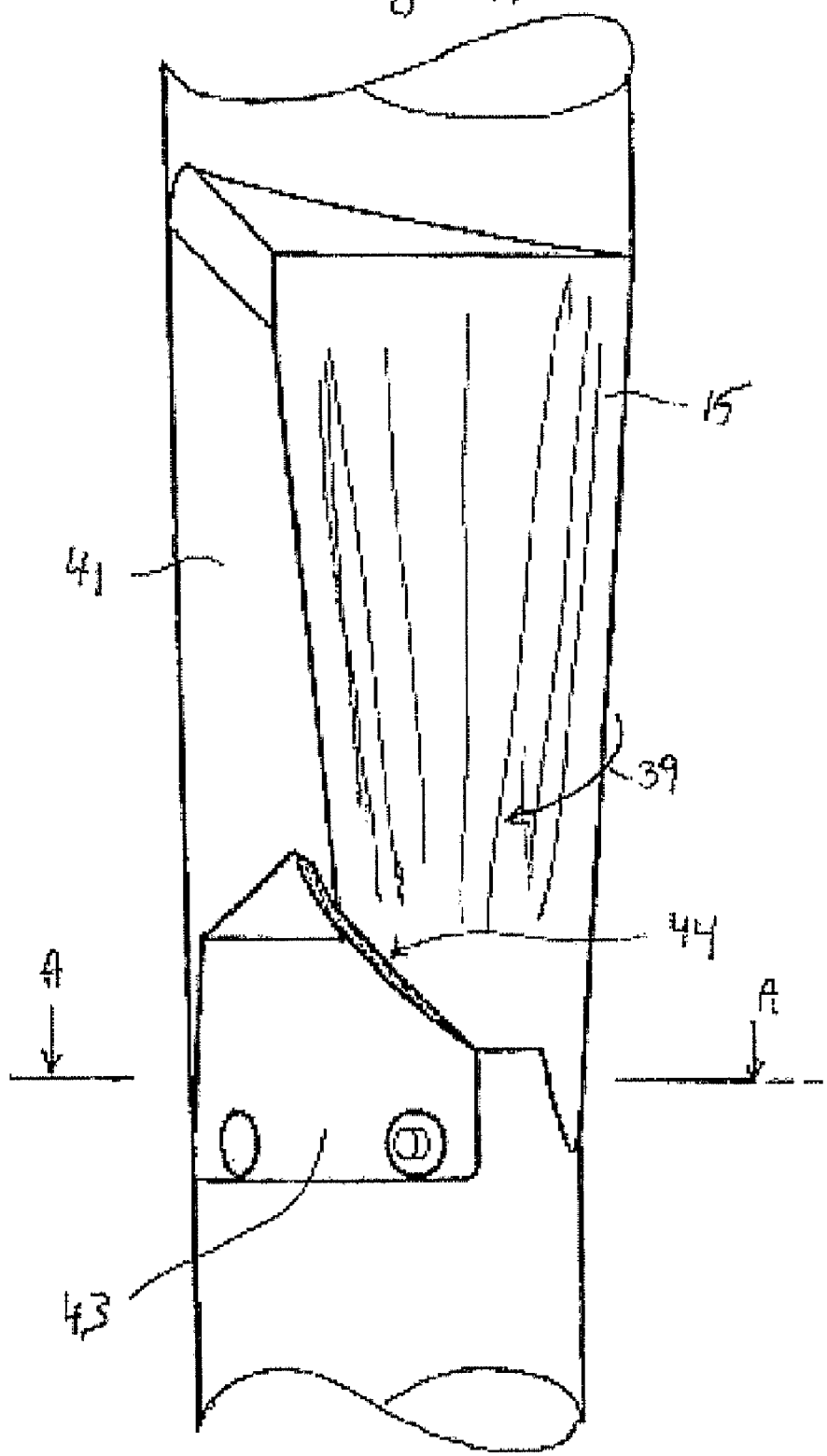
FIG. 2 is a side view of the tool of FIG. 1 showing the filtering means embodied in the form of a skirt.

FIG. 2 provides a schematic view of the outside of the tool. Visible are the conically shaped support surface 15 housing the separator magnet 7, and the ridge 41 housing the bypassing drilling fluid passage.

The dimensions correspond to those given in Table I.

TABLE I

| Part name | Reference number | size |
|---|---|---|
| Axial length of separator magnet | 7 | 120 mm |
| Outer diameter of separator magnet | 7 | 29 mm |
| Diameter in lower part of support surface | 15 | 34 mm |
| Diameter in upper part of support surface | 15 | 52 mm |

The region in the vicinity of the abrasive particle inlet 4 (as depicted in FIG. 1) is shielded by a shield in the form of a skirt 43. A gap is left open between the skirt 43 and the support surface 15, through which gap the abrasive particle inlet 4 is accessible via a path along the support surface 15. The path runs through a filter opening in the form of a slit 44 extending between the skirt 43 and support surface 15.

Figure 3:
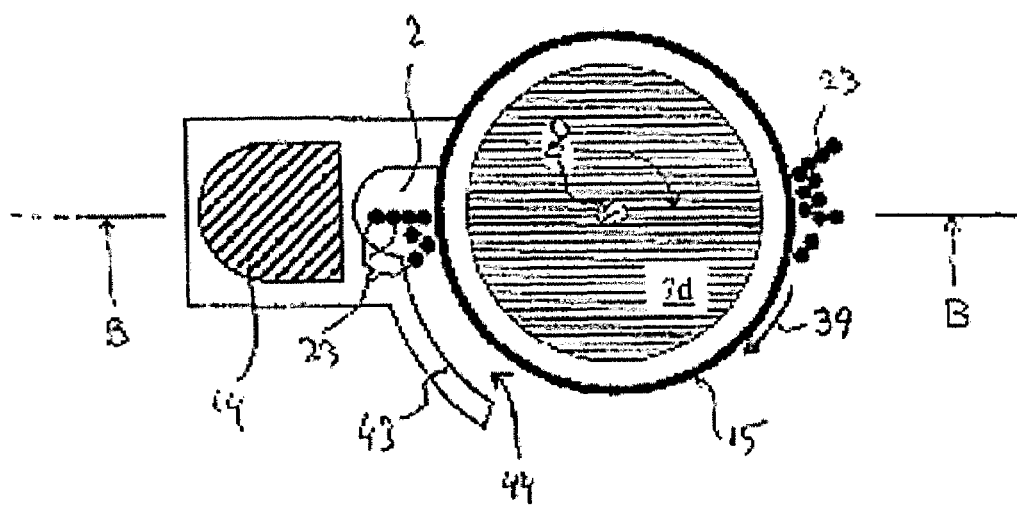
FIG. 3 is a cross sectional view through line A-A on FIG. 2 of an embodiment of the abrasive particle inlet and the skirt.

FIG. 3 shows a cross section along A-A as indicated in FIGS. 1 and 2, through the magnet 7d transverse to axis 8 and through the mixing chamber 2 and the piece of magnetic material 14. Said gap extends between the skirt 43 and the support surface 15. This gap is accessible via slit 44.

It is remarked that the skirt 43 in the tool as depicted in FIGS. 2 and 3 is suitable for use in combination with a clockwise rotatable separator magnet. It will be clear that for a tool with a counter clockwise rotatable separator the skirt must be provided on the other side of the abrasive particle inlet.

If provided, the piece of magnetic material 14 on the side opposite from the abrasive particle inlet 4 draws part of the magnetic field generated by the separator magnet into the mixing chamber 2. As a result, the magnetic force attracting the magnetic particles 23 to the support surface 15 is less strong for magnetic particles that enter the region of the abrasive particle inlet 4. Thereby, entry of the magnetic abrasive particles through abrasive particle inlet 4 into the mixing chamber 2 is further facilitated.

In operation, the tool works as follows. The tool is connected to the lower end of a drill string that is inserted from the surface into a borehole. Referring again to FIG. 1, a stream of drilling fluid is pumped by a suitable pump (not shown) at surface, via the drilling fluid channel of the drill string and the fluid passage 1 into the mixing chamber 2. During initial pumping, the stream is provided with a low concentration of abrasive particles of magnetic material such as steel shot or steel grit.

The stream flows from mixing chamber 2 to mixing nozzle 5 as jetted stream 34 and is jetted against the borehole bottom. Simultaneously the drill string is rotated so that the borehole bottom is evenly eroded. A return stream 36, containing the fluid, the abrasive particles and excavation debris, flows from the borehole bottom through the borehole in a direction back to the surface. Thereby, the return stream passes along the sleeve 15.

Simultaneously with pumping of the stream of drilling fluid, the separator magnet 7 is rotated about its axis 8, in a direction dictated by the sense of the helical bands, which can be either clockwise or counter clockwise. The separator magnet 7 induces a magnetic field extending to and beyond the outer surface of the sleeve 15. As the stream passes along the sleeve 15, the abrasive particles in the stream are separated out from the stream by the magnetic forces from the separator magnet 7 which attract the particles onto the outer surface of the sleeve 15.

The stream of drilling fluid, which is now substantially free from abrasive magnetic particles, flows further through the bore hole to the pump at surface and is re-circulated through the drill string after removal of the drill cuttings.

The magnetic forces exerted to the abrasive particles are lower in the low-field band than in the high-field band. The magnetic particles retained on the support surface 15 are attracted towards the band having the highest magnetic field. Due to rotation of the separator magnet 7 in a direction against the sense of the helical bands, the respective bands and the gradient zone in between exert a force to the magnetic particles in a direction perpendicular to the gradient zone, which has a downward component, thereby forcing the particles to follow a helically downward movement. The particles on support surface 15, along with a portion of the returning fluid, move toward abrasive particle inlet 4 along a fluid path 39 (FIGS. 2 and 3).

As the particles arrive at the abrasive particle inlet 4, the stream of drilling fluid flowing into the mixing chamber 2 again entrains the particles. Once inside the mixing chamber 2, the particles interact with the stream of drilling fluid passing through the mixing chamber 2 from drilling fluid inlet 3 to mixing nozzle 5, and thereby these particles will be entrained in this stream.

In a next cycle the abrasive particles are again jetted against the borehole bottom and subsequently flow through the annulus formed by the tool and the borehole, in the direction to the surface. The cycle is then repeated continuously. In this manner it is achieved the drill string/pumping equipment is substantially free from damage by the abrasive particles as these circulate through the lower part of the drill string only, while the drilling fluid circulates through the entire drill string and pumping equipment. In case a small fraction of the particles flows through the borehole to surface, such fraction can again be replaced via the stream of fluid flowing through the drill string.

A jet pump mechanism in the mixing nozzle 5 generates a strong flow of drilling fluid from the mixing chamber 2 to the mixing nozzle 5. The jet pump mechanism auxiliarily supports the flow of magnetic particles into the mixing chamber 2. A larger diameter of the mixing nozzle 5 compared to a drilling fluid inlet nozzle (between inlet 3 and the mixing chamber 2) results in adequate entrainment of drilling fluid and the magnetic abrasive particles entering into the mixing chamber via abrasive particle inlet 4. The interaction between the entrained drilling fluid and the magnetic particles contributes to the efficiency of the release of particles from the support surface 15 into the mixing chamber 2 as well.

Generally, the skirt 43 provided to form slit 44 functions as a filtering means, whereby the slit 44 functions as a filter opening. The support surface 15 and the inside surface of skirt 43 define a passage channel connecting the abrasive particle inlet 4 with the bore hole annulus. The skirt wall thus shields the abrasive particle inlet 4 from the annulus such that the abrasive particle inlet 4 is only accessible for fluid from the bore hole annulus via a path along the support surface 15.

The skirt arrangement avoids that rock grains larger than the size of the access window of abrasive particle inlet 4 enter the passage channel. The aspect ratio of the slit opening is relatively large in that in the radial direction (transverse to the support surface) the slit opening is smaller than the entrance window (shown in phantom at 38) of the abrasive particle inlet 4, whereas in the circumferential direction along the support surface the slit opening is larger than the entrance window. In this way, should a part of the slit be blocked by for instance a rock grain, another part of the slit can still be available for passage of abrasive particles and fluid.

This arrangement of the skirt 43 also guides the flow of drilling fluid from the bore hole annulus to the mixing chamber 2, along the support surface 15 in the direction of the desired transport. In order to entrain sufficient drilling fluid with the flow of magnetic particles, the velocity of the drilling fluid in the bore hole annulus should preferably not exceed 3 m/s. Optionally, additional slots are provided in the skirt wall on the annular side.

Figure 4:
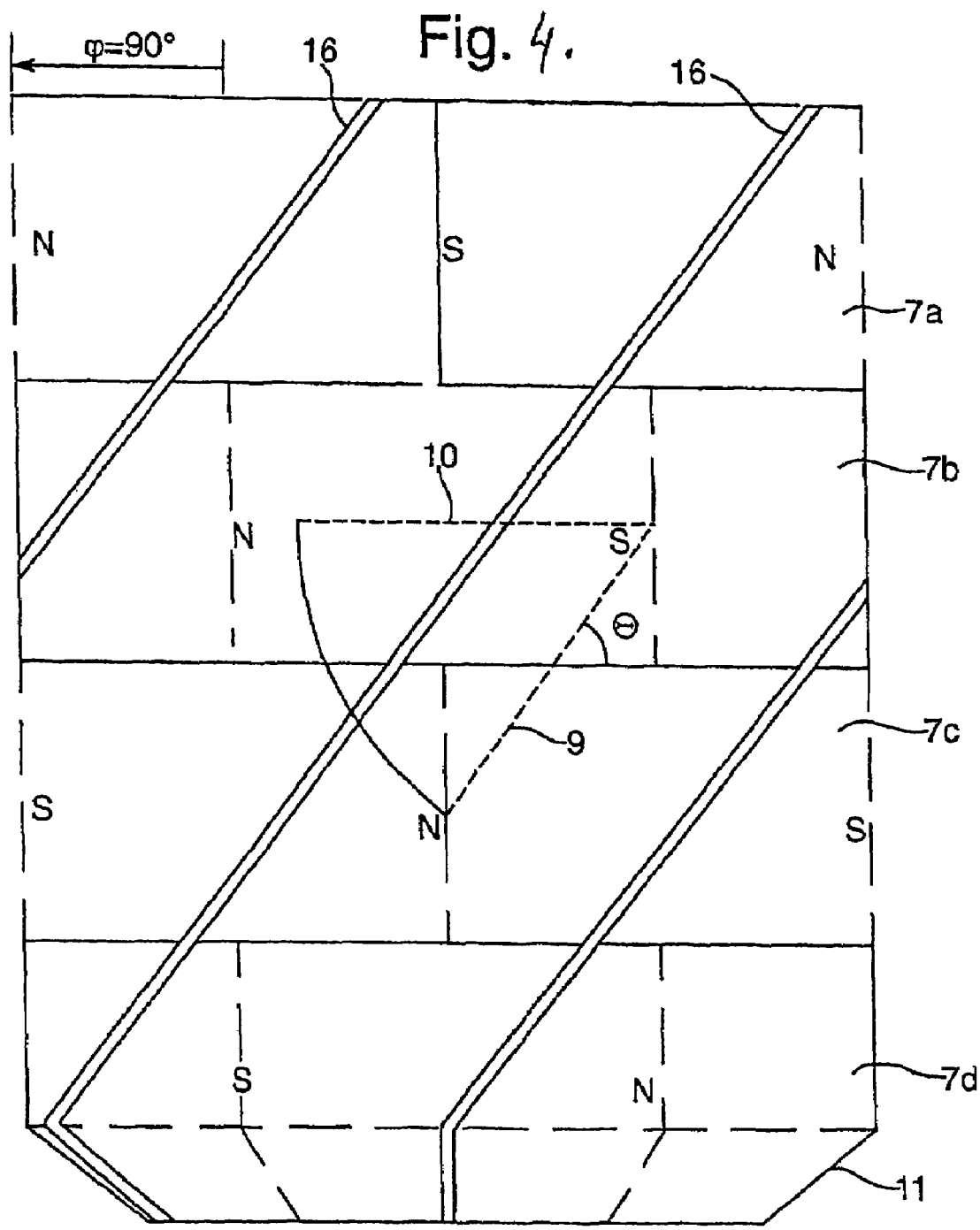
FIG. 4 is a surface map of a possible magnet surface arrangement for the tool of FIG. 1.

A separator magnet 7 with a right-handed helical sense (for counter clockwise rotation) is shown in FIG. 4, in a representation wherein the cylindrical surface is unrolled flat in the plane of the paper. Thus vertically is set out the height of the separator magnet, which is divided in smaller magnets 7a, 7b, 7c, and 7d, and horizontally the surface at all azimuths between 0 and 360° is visible. As can be seen, the angle $\phi$ in this case is 90° in respect of every one of the smaller magnets in the stack, $\phi$ being the azimuth angle difference between the projected N-S directions in two neighbouring smaller magnets. Alternatively, the angle $\phi$ can be varied along the magnet stack.

The areas 16 schematically indicate the gradient zones, where the magnetic field strength decreases most steeply from the increased value in the high-field band to the value in the low-field band.

Depending on both $\phi$ and the axial height of the smaller magnets, each of the two high-field bands stretches in a direction making an angle $\theta$ with respect to the plane perpendicular to the central longitudinal axis as is indicated in FIG. 4. The angle θ can vary along the magnetic stack.

Magnetic particles retained on the support surface by the separator magnet tend to arrange themselves in elongate chains along a magnetic path from one pole to the nearest pole of opposite polarity. The shortest magnetic path on the approximately cylindrical surface between two adjacent N- and S-pole locations within one high-field band, indicated in FIG. 4 by dotted line 9, is shorter than the shortest path across the approximately cylindrical surface between a S-pole (or N-pole) location in that high-field band and the nearest N-pole (S-pole) location in another high-field band. Thus, the magnetic particles will tend to form a chain along line 9 in alignment with a high-field band. For reference, dotted line 10 is indicated having the same path length as dotted line 9 and it can be seen that this dotted line 10 is too short to bridge the distance from the N pole in the high-field band to the nearest S pole outside the band crossing the gradient zone 16.

The relevant distances are determined on the support surface, since that is approximately the distance over which the chains of particles would grow.

In each of the separator magnets 7 described above, the high- and low-field bands were formed by virtue of the field distribution of bipolar cylindrical magnets. This results in bands of increased magnetic field strength. Magnetic particles retained on the support surface react most directly to the advancement of the gradient zone if the change in the magnetic field in the gradient zone is large. To achieve this, the low-field band preferably corresponds to a region of reduced magnetic permeability of the magnet and/or a gap between the separator magnet and the support surface. Herewith a more abrupt gradient zone between high- and low-field bands is achieved.

FIG. 5 shows an alternative separator magnet arrangement, also for counter clockwise rotation, whereby the magnets 7a to 7d of FIG. 1 are replaced by twice as many magnets each having half the axial height of those magnets 7a to 7d. Again, a different number of magnets may be employed. The magnets in the middle are stacked in NNSSNN or SSNNSS sequence, whereby all the adjacent poles are on a helical band. In comparison with the separator magnet 7 of FIG. 1, the neighbouring N-N and S-S pole combinations are pseudo-helically shaped in conformity with the helical arrangement of the band. Moreover, magnetic poles on the separator magnet formed by the first and last of the smaller magnets in the stack are smaller in the stacking direction than the magnetic poles in the middle portion of the separator magnet. This has the advantage that the magnetic path from the top most or the bottom most magnetic pole in the high-field band can find its nearest magnetic pole of opposite polarity in the same high-flied band. The first and last magnets in the stack may even have a smaller axial height than the other magnets in the stack.

Figure 5A:
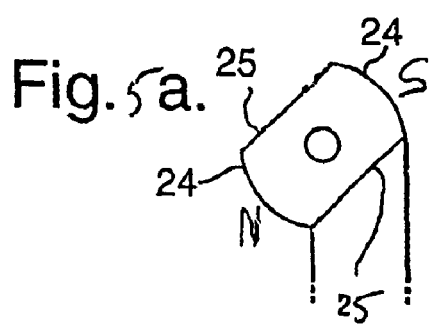
FIGS. 5a-5c show an alternative magnet arrangement for use in the tool.

In the embodiment of FIG. 5, the region of reduced magnetic permeability is provided in the form of a helical recess 26 in the outer surface of the separator magnet 7 adjacent to the high-field band. Due to the higher magnetic permeability of the magnet material than the less magnet material that fills up the recesses (a gas, a fluid, or a solid) the internal magnetic field lines predominantly follow the material of the magnet rather than the material contained in the recess. This makes the high-field band of increased magnetic field strength, adjacent the recess 26, more pronounced. FIG. 5a shows a cross section of the separator magnet, which shows circular contours 24 around the diametrically opposing poles, connected by essentially straight contours 25. The straight contours correspond with the recess 26 and the circular contours with the high-field bands of increased magnetic field strength.

Figure 5B:
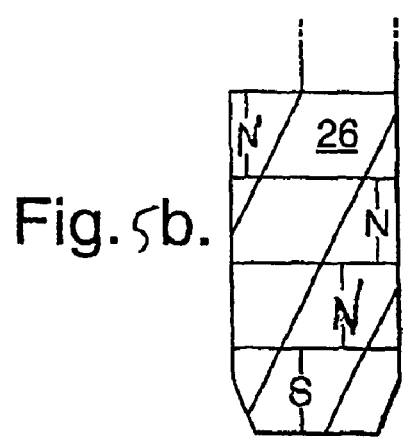
Figure 5C:
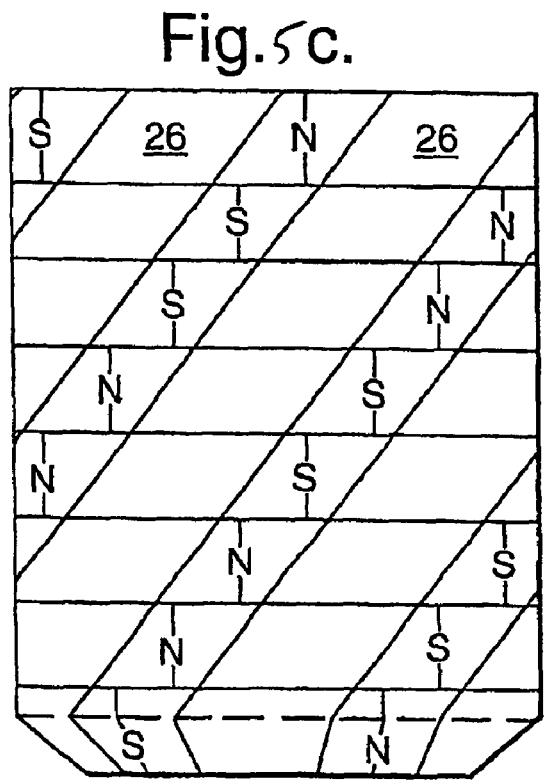

In FIG. 5b a schematic longitudinal view is provided of the separator magnet, whereby the slanted lines indicate the transition between the circular contours and the essentially straight contours. FIG. 5c provides a schematic representation of the entire surface in the same way as in FIG. 4. The angle θ of the helical recess is 53°.

Preferably, the recess reaches a depth with respect to the cylindrical circumference of the separator magnet that is similar as or greater than the distance between the gap between the magnetic surface in the high-field band and the support surface.

It will be clear that the separator magnets shown in FIGS. 4 and 5 for counter clockwise rotation can also be prepared for clockwise rotation by inverting the sense of the helical bands from right- to left-handed.

Suitable magnets for the device for transporting particles of a magnetic material and for the described recirculation system can be made from any highly magnetisable material, including NdFeB, SmCo and AlNiCo-5, or a combination thereof.

Preferably the separator magnet also has a magnetic energy content of at least 140 kJ/m$^3$ at room temperature, preferably more than 300 kJ/m$^3$ at room temperature such as is the case with NdFeB-based magnets. A high energy content allows for shorter axial contact length of the support surface with the return stream, and consequently a stronger taper of the support surface which is advantageous for the axial transport rate. Also, less power is required for the rotation of the separator magnet.

The sleeve 15 and the drilling fluid bypass 1 are normally made of a non-magnetic material. They are suitably machined out of a single piece of the material in order to obtain optimal mechanical strength. Super alloys, including high-strength corrosion resistant non-magnetic Ni—Cr alloys, including one sold under the name Inconel 718 or Allvac 718, have been found to be particularly suitable. Other materials can be used including BeCu.

When excavating a bore hole in an earth formation, the return stream of drilling fluid in the bore hole annulus (formed by the bore hole wall and the excavating tool) may pass the recirculation system at a velocity of 2 m/s or even higher. The reach of the magnetic field into the bore hole annulus should exert a pulling force on the particles sufficiently strong to pull them to the support surface before they have passed the device. At the same time, the magnetic force pulling the particles onto the housing should be as low as possible in order to minimise friction forces and power requirements for rotating the separator magnet. The most suitable magnet is one that has an as high as possible coefficient for the lowest dominant radial polar moment, which is typically a magnet having a dominant dipole behaviour over a quadrupole behaviour for a certain energy content.

In order to achieve the best capture efficiency of the recirculation system, the separator magnet is preferably located in the axial centre of the bore hole. In a typical bore hole, a small axial offset of up to 15% of the diameter of the excavation tool is acceptable. The embodiment shown in FIG. 2 has an axial offset of the magnet contained axially inside the support surface 15 of 10%, or approximately 7 mm for a targeted 70 mm diameter bore hole.

As an alternative for the cylindrical separator magnet, the outer diameter of the separator magnet and the inner diameter of the inside wall 35 can be made to reduce with decreasing axial height. The smaller magnets from which the separator magnet is assembled can be of a frustoconical shape to obtain a tapered shape of the separator magnet. The gap between the separator magnet and the inside wall of the support sleeve may also decrease, as well as the wall thickness of the support sleeve.

The drilling fluid in the mixing nozzle 5, or in the abrasive jet, may contain a concentration of typically up to 10% by volume of magnetic abrasive particles. A typical concentration of magnetic abrasive particles that is supplied via the bypass conduit 1 lies between 0.1 and 1% by volume. The separator magnet is typically driven at a rotational frequency of between 10 and 40 Hz.

Filtering means like shown above, in particular comprising a skirt, can be applied in recirculation systems for magnetic particles in general, in particular to recirculation systems having other types of separator magnet arrangements than that of the recirculation system described above, examples of which are provided in WO 02/34653 and in U.S. Pat. No. 6,510,907.

As explained above, the slit 44 formed between the skirt 43 and the support surface 15 has a large aspect ratio so that part of the slit 44 can remain open even if another part is blocked by a rock grain.

It is alternatively possible to provide a number of filter openings each being smaller than the entrance window of the inlet opening 4, at least in one direction, but being spaced apart over a distance larger than the size of the entrance window of the inlet opening 4.

In either way, the cumulative passable area of the one or more filter openings can be larger than that of the entrance window of abrasive particle inlet 4.

I claim:

1. A tool for excavating an object, the tool comprising:
   a jetting system having a nozzle means arranged to receive a fluid and abrasive particles via an abrasive particle inlet, and arranged to impinge the object to be excavated with a jetted stream of the fluid mixed with the abrasive particles;
   a recirculation system arranged to recirculate at least some of the abrasive particles from a return stream, downstream of impingement of the jetted stream on the object to be excavated, back to the jetting system via the abrasive particle inlet, and
   a filtering means disposed in a path fluidly connecting said return stream with the abrasive particle inlet, wherein the filtering means includes an opening that is sized to keep the abrasive particle inlet free from objects of the same size or larger than the abrasive particle inlet, which filtering means allows passage of the abrasive particles;
   wherein the recirculation system comprises a transport device for transporting the abrasive particles in a selected direction towards the abrasive particle inlet, the abrasive particle containing a magnetic material, and the transport device comprising:
      a support member having a support surface for supporting the abrasive particles, the support surface extending the selected direction;
      a separator magnet arranged to generate a magnetic field for retaining the particles on the support surface whereby the magnetic field on the support surface is arranged to have a high-field band, a low-field band, and a magnetic field gradient in a gradient zone between said high- and low-field bands whereby the magnetic field strength in the high-field band is higher than that in the low-field band; and
      means for advancing the high- and low-field bands relative to the support surface in a direction having a component in the direction of the magnetic field gradient on the support surface, whereby the high-field band is followed by the low-field band.

2. The tool according to claim 1, wherein the filtering means is provided with one or more filter openings shaped or arranged such that the filtering means is impassable for a particle having the same projected size and shape as the entrance window of the abrasive particle inlet and at the same time such that the one or more filter openings cannot be fully blocked by one such a particle.

3. The tool according to claim 1, wherein the recirculation system comprises a support surface to guide the abrasive particles towards the abrasive particle inlet, whereby the filtering means are provided in the form of a skirt creating a filter opening in the form of a slit between the skirt and support surface.

4. The tool according to claim 3, whereby the skirt comprises an arcuate member arranged to guide fluid from the return stream into said abrasive particle inlet in a path along the support surface.

5. The tool according to claim 1, whereby along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

6. The tool according to claim 1, wherein the gradient zone is helically arranged around the separator.

7. The tool according to claim 2, wherein the recirculation system comprises a support surface to guide the abrasive particles towards the abrasive particle inlet, whereby the filtering means are provided in the form of a skirt creating a filter opening in the form of a slit between the skirt and support surface.

8. The tool according to claim 7, whereby the skirt comprises an arcuate member arranged to guide fluid from the return stream into said abrasive particle inlet in a path along the support surface.

9. A tool for excavating an object, the tool comprising:
   a jetting system having a nozzle means arranged to receive a fluid and abrasive particles via an abrasive particle inlet, and arranged to impinge the object to be excavated with a jetted stream of the fluid mixed with the abrasive particles, and
   a recirculation system arranged to recirculate at least some of the abrasive particles from a return stream, downstream of impingement of the jetted stream on the object to be excavated, back to the jetting system via the abrasive particle inlet;
   wherein the abrasive particle inlet having an entrance window and wherein filtering means are provided in a path fluidly connecting said return stream with the entrance window, for keeping the abrasive particle inlet free from objects of the same size or larger than the size of the entrance window, which filtering means is passable for the abrasive particles;
   wherein the filtering means is provided with one or more filter openings shaped or arranged such that the filtering means is impassable for a particle having the same projected size and shape as the entrance window of the abrasive particle inlet and at the same time such that the one or more filter openings cannot be fully blocked by one such a particle; and wherein at least one filter opening is in one direction sized smaller than the entrance window of the abrasive particle inlet and in another direction larger than said entrance window.

10. The tool according to claim 9 wherein the filtering means is provided with a plurality of filter openings, each filter opening being smaller than the entrance window of the abrasive particle inlet, at least in one direction lateral to the path, and consecutive filter openings being spaced apart over a distance larger than the size of the entrance window of the abrasive particle inlet opening.

11. The tool according to claim 9, wherein the recirculation system comprises a support surface to guide the abrasive particles towards the abrasive particle inlet, whereby the filtering means are provided in the form of a skirt creating a filter opening in the form of a slit between the skirt and support surface.

12. The tool according to claim 11, whereby the skirt comprises an arcuate member arranged to guide fluid from the return stream into said abrasive particle inlet in a path along the support surface.

13. The tool according to claim 9, wherein the recirculation system comprises a transport device for transporting the abrasive particles in a selected direction towards the abrasive particle inlet, the abrasive particles containing a magnetic material, and the transport device comprising:
a support member having a support surface for supporting the abrasive particles, the support surface extending in the selected direction;
a separator magnet arranged to generate a magnetic field for retaining the particles on the support surface whereby the magnetic field on the support surface is arranged to have a high-field band, a low-field band, and a magnetic field gradient in a gradient zone between said high- and low-field bands whereby the magnetic field strength in the high-field band is higher than that in the low-field band;
means for advancing the high- and low-field bands relative to the support surface in a direction having a component in the direction of the magnetic field gradient on the support surface, whereby the high-field band is followed by the low-field band.

14. The tool according to claim 13, whereby along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

15. The tool according to claim 9, wherein the total passable area of the at least one filter opening is larger than that of the entrance window of the abrasive particle inlet filter.

16. A tool for excavating an object, the tool comprising:
a jetting system having nozzle means arranged to receive a fluid and abrasive particles via an abrasive particle inlet, and arranged to impinge the object to be excavated with a jetted stream of the fluid mixed with the abrasive particles; and
a recirculation system arranged to recirculate at least some of the abrasive particles from a return stream, downstream of impingement of the jetted stream on the object to be excavated, back to the jetting system via the abrasive particle inlet;
wherein the abrasive particle inlet has an entrance window and wherein filtering means are provided in a path fluidly connecting said return stream with the entrance window, for keeping the abrasive particle inlet free from objects of the same size or larger than the size of the entrance window, which filtering means is passable for the abrasive particles; and
wherein the filtering means is provided with a plurality of filter openings, each filter opening being smaller than the entrance window of the abrasive particle inlet, at least in one direction lateral to the path, and consecutive filter openings being spaced apart over a distance larger than the size of the entrance window of the abrasive particle inlet opening.

* * * * *